Figure 1:
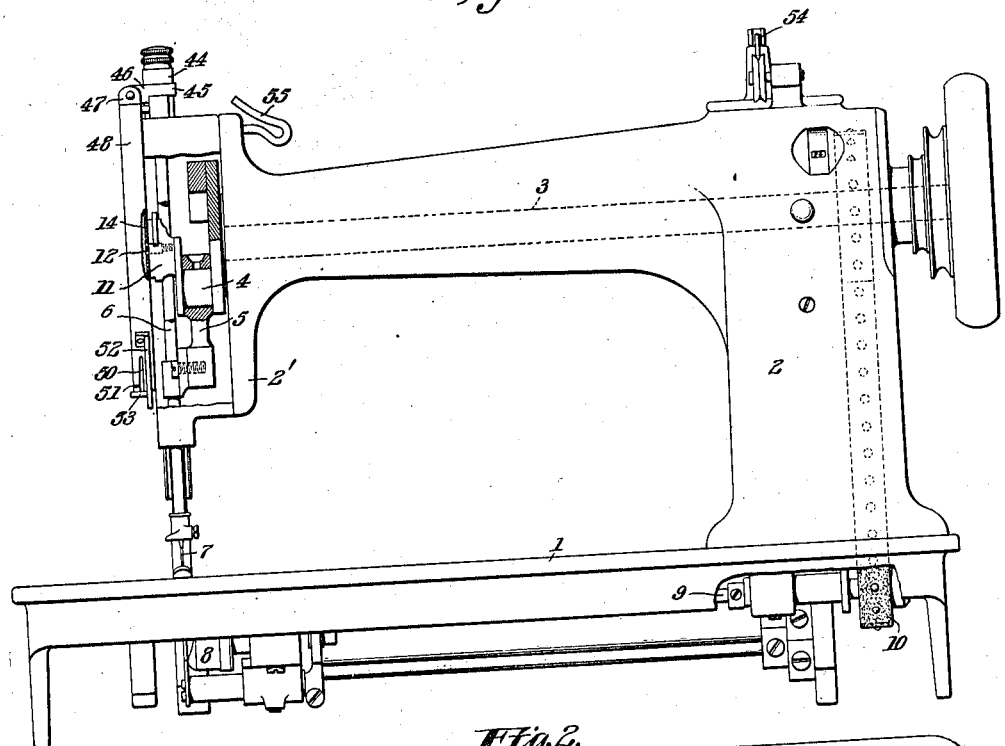

W. N. PARKES.
SEWING MACHINE TAKE-UP.
APPLICATION FILED MAY 2, 1914.

1,148,794.

Patented Aug. 3, 1915.
6 SHEETS—SHEET 1.

WITNESSES:
L. E. Fischer.
Ova L. Terra

INVENTOR
William N. Parkes
BY
Henry J. Miller
ATTORNEY

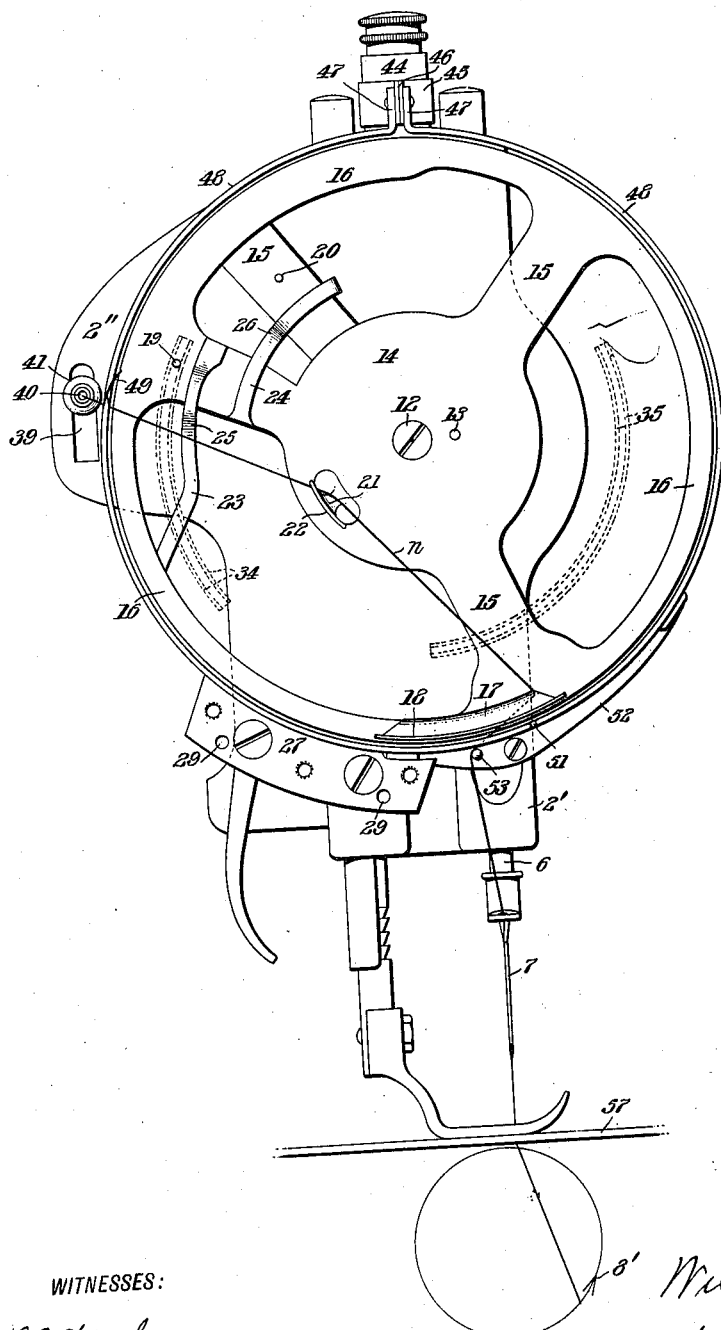

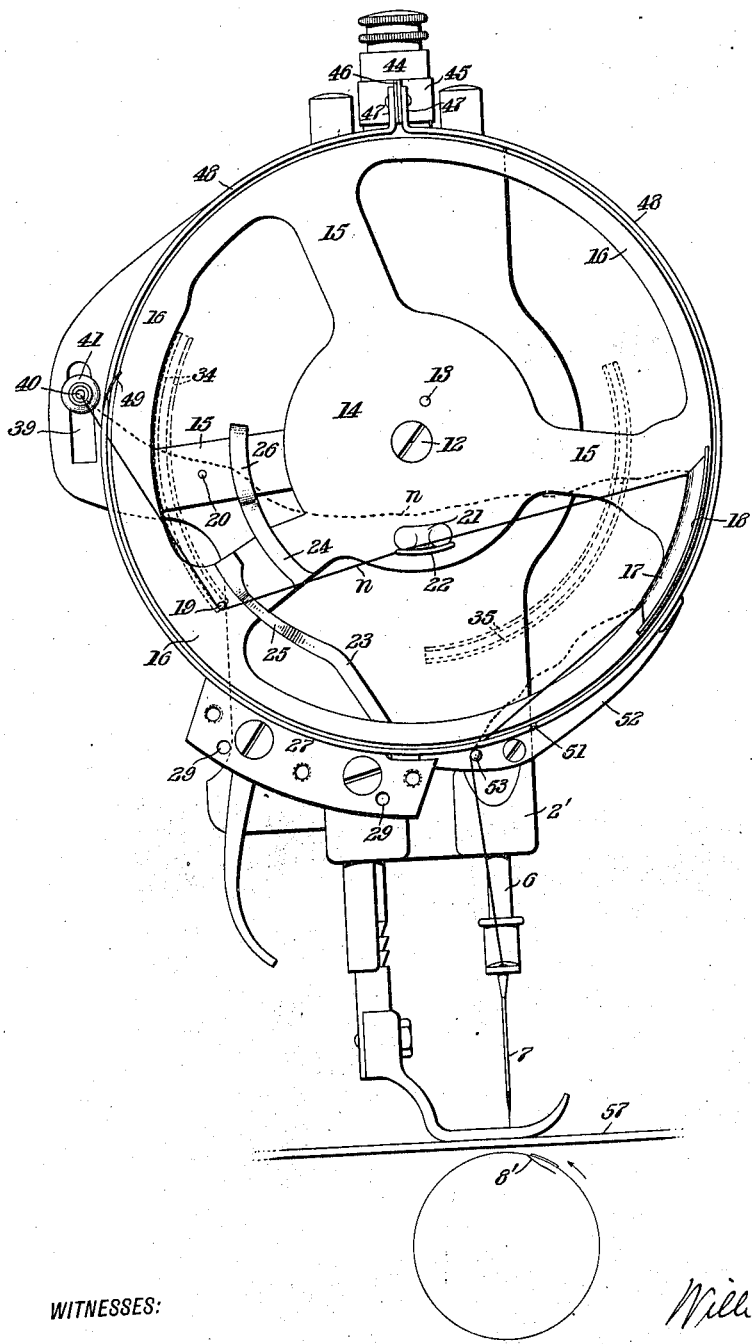

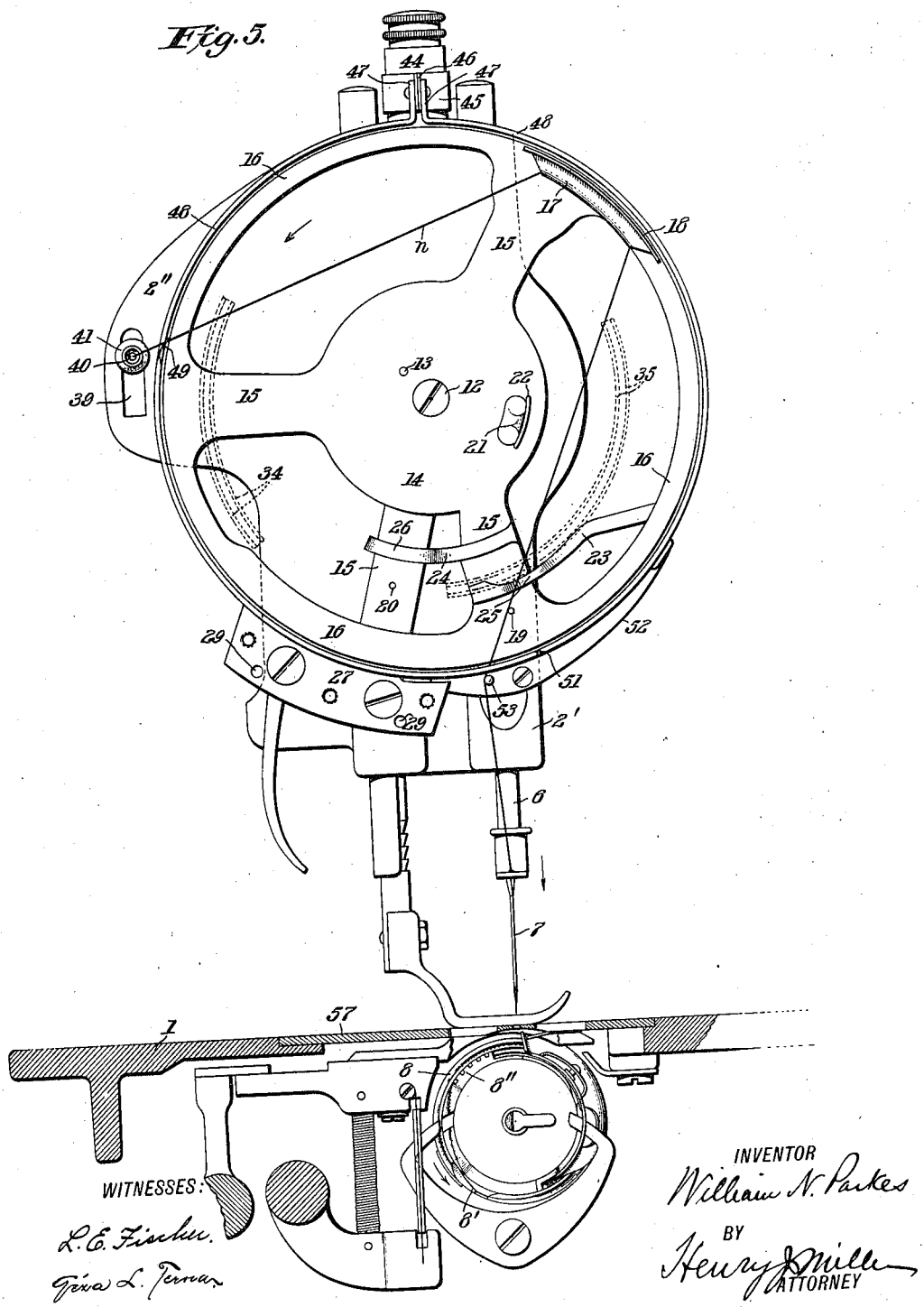

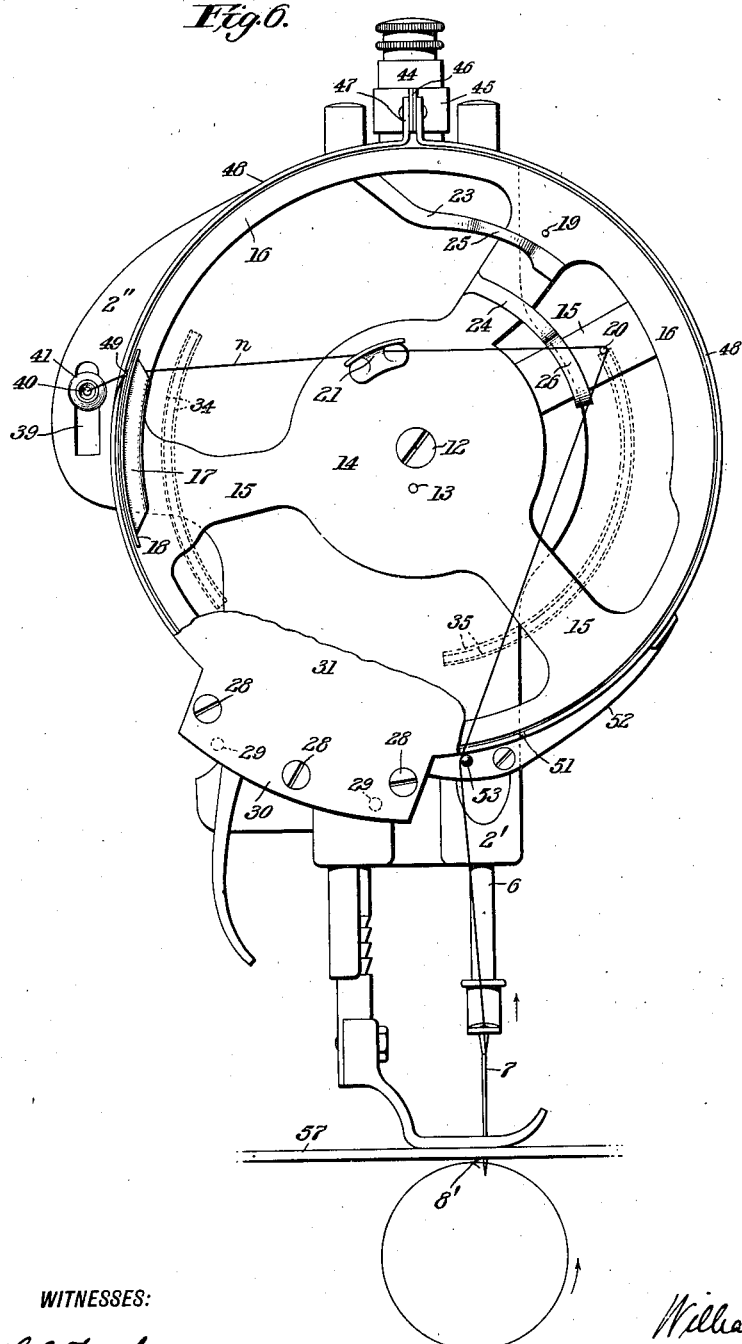

W. N. PARKES.
SEWING MACHINE TAKE-UP.
APPLICATION FILED MAY 2, 1914.
1,148,794.
Patented Aug. 3, 1915.
6 SHEETS—SHEET 6.
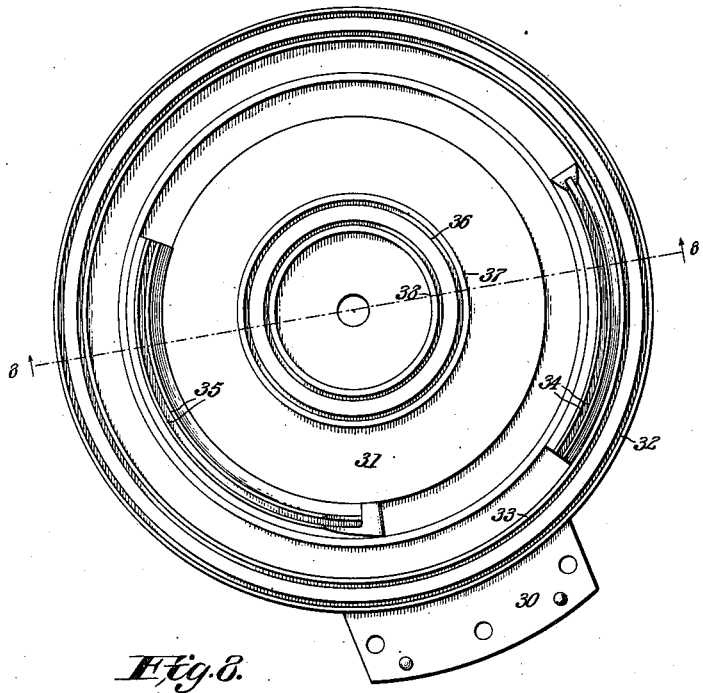
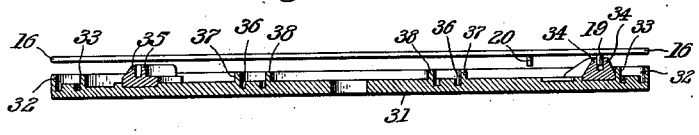
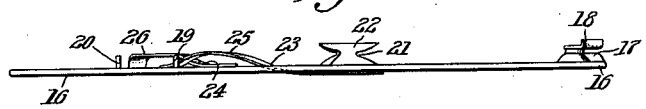
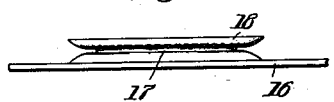
WITNESSES:
L. E. Fischer.
INVENTOR
William N. Parkes
BY
Henry J. Miller
ATTORNEY

UNITED STATES PATENT OFFICE.

WILLIAM N. PARKES, OF BROOKLYN, NEW YORK, ASSIGNOR TO THE SINGER MANUFACTURING COMPANY, A CORPORATION OF NEW JERSEY.

SEWING-MACHINE TAKE-UP.

1,148,794.  Specification of Letters Patent.  Patented Aug. 3, 1915.

Application filed May 2, 1914. Serial No. 835,842.

*To all whom it may concern:*

Be it known that I, WILLIAM N. PARKES, a citizen of the United States, residing at Brooklyn, in the county of Kings and State of New York, have invented certain new and useful Improvements in Sewing-Machine Take-Ups, of which the following is a specification, reference being had therein to the accompanying drawings.

This invention has for its object to provide a take-up which shall have a direct action upon the thread leading from the source of supply to the needle, which shall rotate in unison with the needle-actuating shaft upon which it may be fixed without resort to intermediate connections, which shall have a positive action upon the thread in each operative stage of its control of the thread in a stitch-forming cycle, and which shall have rapid and gradual actions with an intermediate interval of inaction in drawing up to the under face of the work the thread cast off by the loop-taker and subsequently setting the stitch, respectively.

The invention is preferably embodied in a sewing machine comprising a reciprocating needle and a coöperating rotary hook having a stationary thread-case journaled therein and performing two rotations for each reciprocation of the needle, but it is well adapted for coöperation with other types and varieties of stitch-forming mechanism.

In its preferred form, the take-up comprises a rotary disk or member fixed upon the forward end of the needle-actuating shaft and provided near the periphery upon its outer face with a primary segmental take-up element and nearer its axis of movement upon the same face, and thus within its field of action, with an auxiliary take-up pin or thread-engaging element. The outer extremities of said elements are housed within concentric grooves of a stationary disk sustained by a rigid part of the machine and serving to confine the needle-thread to engagement with said elements throughout portions of each rotation of said disk.

The rotary disk is preferably provided with a thread-engaging pin disposed within the field of action of the auxiliary take-up element and serving as a slack-thread controlling element operated during a period of inaction of the auxiliary take-up element; while a fourth thread-engaging element disposed upon the outer face of and still nearer the axis of movement of the rotary disk serves as an auxiliary slack-thread controller and operates to regulate the delivery of the thread from the take-up in its movement to the needle. The extremities of these slack-controlling elements are also preferably housed within concentric grooves in the adjacent face of the stationary disk for confining the thread in engagement with said elements.

As the auxiliary take-up element and primary slack-controlling element are designed to engage the thread through only small portions of a complete rotation, their housing grooves or guards are segmental in form, and the rotary disk is preferably provided adjacent said elements with convexly-arched thread-deflectors whereby the thread is forcibly stripped therefrom as they emerge from their housing or thread-confining grooves. By this means, the period of action of each of these elements upon the thread is accurately timed, and their positive action upon the thread is insured.

In practice, the needle thread is led from the source of supply through the tension device and thence through a thread-guide adjacent one side of the take-up disk from which it extends across the face of the latter and is delivered through a guide adjacent and beneath the take-up disk in its passage to the needle. As a needle-thread loop is carried to cast-off position by the loop-taker in its loop-casting action, the primary take-up element engages the needle-thread adjacent the inlet thread-guide and begins its thread-drawing action which is soon supplemented by engagement of the auxiliary take-up element with another portion of the bight of needle-thread extending across the face of the take-up disk, thereby effecting a quick reduction of the needle-thread loop and the positioning of the same loosely upon the under face of the fabric. The instantaneous disengagement of the thread from the auxiliary take-up element at the completion of its period of action, while the thread remains taut, serves to render temporarily ineffective the continued operative movement of the primary take-up element, but the thread thus temporarily slackened is again drawn up to set the stitch as the primary take-up element approaches its extreme operative position more remote from the points of entrance and delivery of the thread within the range of action of the take-up.
The primary object of the initial rapid take-up action is to draw up the needle-thread loop sufficiently close to the under face of the work to escape re-seizure by the loop-taker point in its idle rotation while the needle is elevated above the work, and the disengagement of the auxiliary take-up element from the needle-thread prevents the premature setting of the stitch and drawing of superfluous thread through the tension. The gradual setting of the stitch in the final take-up action not only insures against the disarrangement of the previous stitch and breaking of the thread by a too abrupt pull upon the same, but avoids the liability of the slipping of the thread upon the periphery of a well-known form of tension-wheel with which the machine may be provided.

Figure 2:
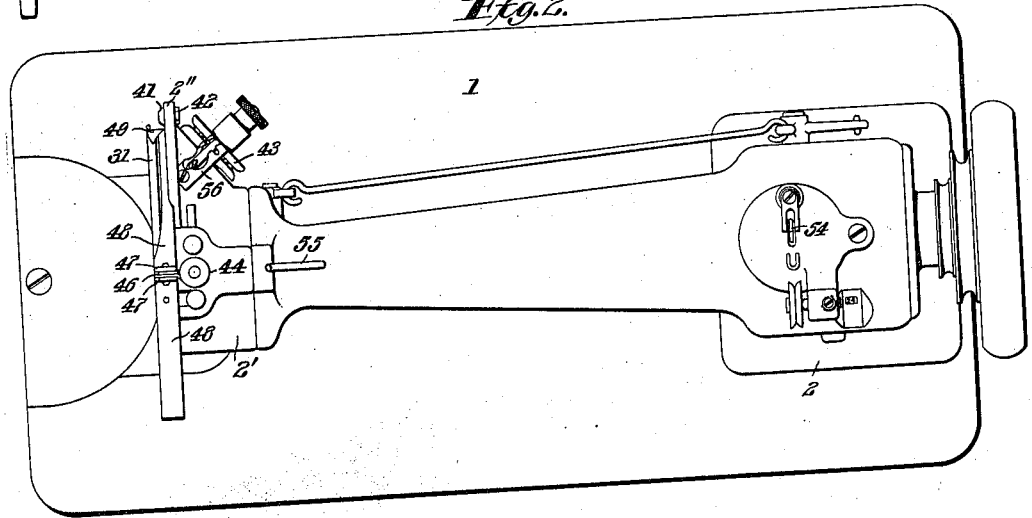

In the accompanying drawings, Figure 1 is an elevation and Fig. 2 a plan of a sewing machine provided with the present improvements. Figs. 3, 4, 5 and 6 are enlarged end views of portions of the machine showing the take-up and slack thread-controlling elements in different operative positions, Fig. 5 showing, in addition to the other figures, the sewing machine bed-plate and the loop-taker. Fig. 7 is an elevation showing the inner face of the stationary take-up disk, and Fig. 8 a view of the same in transverse section with the rotary disk in edge view. Fig. 9 is an edge view of the rotary disk detached, and Fig. 10 an edge view of a portion of the rotary disk containing the primary take-up element.

The machine frame is shown constructed with the usual bed-plate 1 provided with the bracket-arm 2 terminating in the hollow head 2' and having journaled therein the main or needle-bar actuating shaft 3 provided at its forward end with the crank 4 connected by the pitman 5 with the needle-bar 6 carrying the needle 7. The needle coöperates in the production of stitches with the rotary hook 8 having the beak 8' secured upon the forward end of a shaft 9 journaled beneath the bed-plate and connected by means of the apertured belt 10 and suitable pin-wheels with the mainshaft 3. The hook or loop-taker, as shown herein, performs two rotations for each reciprocation of the needle-bar.

The needle-bar crank is provided with a lateral extension having a boss 11 upon which is secured concentrically with the shaft 3 by means of the screw 12 and steady pin 13 the inner or hub portion 14 of the rotary take-up wheel or disk which is shown provided with the radial spokes 15 and the rim 16. The rotary disk carries upon the forward face of its rim 16 the laterally grooved segmental projection 17 of substantially U-shaped cross-section, constituting the primary take-up element, and provided with a forwardly extending lip 18 at its outer edge (Fig. 9).

At a point near the rim 16 circumferentially remote from the element 17, and upon the forward face of the rotary disk, is an auxiliary take-up pin 19.

At a point farther from the rim and upon one of the spokes 15 beyond the auxiliary take-up pin 19 is a second thread-engaging pin 20 serving as the primary slack-thread controlling element.

Sustained by the hub portion 14 of the take-up disk intermediate the primary and auxiliary take-up elements is the slack-thread controlling stud 21 having a segmental head 22 concentric with the axis of the disk.

Adjacent the pins 19 and 20 and between the same and the hub portion 14 of the disk are the thread-deflecting cross-bars 23 and 24, the former being shown attached at one end to one of the spokes 15 and the opposite end to the rim 16, and the latter attached at one end to said spoke and at the other end to the adjacent spoke 15. The bar 23 is forwardly arched at 25 adjacent the pin 19 and the bar 24 is similarly arched at 26 intermediate the pin 20 and the hub 14, the arched portions of these bars extending from the forward face of the disk beyond the ends of their respective pins.

Secured upon a suitable seat 27 projecting from the lower portion of the bracket-arm head 2' by means of screws 28 and dowel pins entering the holes 29 therein is the forwardly offset flange 30 of the stationary shield-plate 31 in the form of a disk concentric with the rotary take-up disk with its adjacent face disposed parallel with and spaced slightly from the forward face of the take-up disk. This stationary disk is provided in its rearward face near the periphery with the housing groove 32 entered by the segmental lip 18 of the primary take-up element 17, adjacent which is the annular guard-rib 33 serving to confine the needle-thread $n$ within the outer groove of the take-up element 17. The disk 31 is provided also at one side of the flange 30 and near the periphery with the spaced concentric segmental guard-ribs 34 forming between them a groove or runway entered by and forming a housing for the extremity of the auxiliary take-up pin 19.

Disposed concentrically with the housing groove 32 and upon the opposite side of the flange 30 from the ribs 34 are the spaced segmental guard-ribs 35 affording between them a groove or runway entered by and forming a housing for the extremity of the primary slack-controlling pin 20. The stationary disk 31 is provided also with the circular housing groove 36 concentric with the axis of movement of the take-up disk to receive and house the head or cross-member 22 of the auxiliary slack-controlling stud 21, the adjacent concentric ribs 37 and 38 projecting beyond the face of the stationary disk 31 serving to confine the thread to the central portion of the stud 21 in controlling the thread. The guard-ribs 34 and 35 project beyond the plane of the extremities of the ribs 33, 37 and 38, as will be seen by reference to Fig. 8.

The bracket-arm head is formed with a lateral flange 2" having a vertical slot 39 in which is adjustably secured the centrally apertured eyelet-stud 40 having the head 41 clamped upon the forward face of said flange by means of the nut 42. This eyelet-stud affords a guide through which the thread is led to the take-up from the tension device 43, represented in Fig. 2 as of the well-known thread-wheel type, such as that disclosed in the United States Patent No. 413,657, of October 29, 1899.

Rising from the top of the bracket-arm head is a boss 44 embraced by the split collar 45 having the end flanges 46 upon which are clamped the flanges 47 of a guard-ring or strap 48 surrounding the peripheries of the rotary and stationary disks. The ring 48 is cut away adjacent and above the thread-guide 41 to expose the space between the take-up disks and to afford a thread-guiding spur 49 adjacent the guide 41; and is formed in its lower side with a circumferentially extending thread-slot 50 of well-known form also in register with the space intermediate the take-up disks and provided between its ends with a threading opening 51. It is of course immaterial whether or not the guard-ring 48 be formed separately from the stationary take-up disk 31, as they remain in fixed relation at all times. Secured to the periphery of the guard-ring is a segmental bracket-piece 52 provided with the forwardly projecting guide-pin 53 extending across the thread-slit 50 and serving to confine the thread between itself and one end of the slit in its delivery from the take-up to the needle.

The loop-taker represented in the drawings is that of my application filed simultaneously herewith and comprising the hook shell 8 formed with the loop-seizing beak 8' and having journaled therein the thread-case 8" containing the mass of lower thread.

In threading the machine, the needle thread $n$ is led from the source of supply through the pull-off device 54 and thence through the open-eyed thread-guide 55 and over the check guide-pin 56 and through the tension device 43 and thence through the eyelet-stud 40 41. It is thence passed across the cut out portion of the guard-ring 48 into the space between the tension-disks and intermediate the edge of the stationary disk and said guard-ring and through the opening 51 into the thread-slit 50 and over the guide-pin 53 from which it is led downwardly along the needle-bar and into the needle-eye, all as represented in Figs. 3, 4, 5 and 6.

In the operation of the machine, the needle descends through the throat-plate 57, and as it rises a loop of its thread is seized by the beak 8' of the hook and cast about the thread-case. As the needle-thread loop reaches cast-off position slightly in advance of the extreme lower side of the hook, the bight of the needle-thread lying across the face of the rotary take-up disk is engaged by the advance end of the segmental primary take-up element 17, and carried upwardly as represented in Fig. 3. In this primary thread-drawing action, the auxiliary take-up pin 19, projecting into its runway between the guard-ribs 34, enters into positive engagement with a portion of said bight of needle-thread between the eyelet-stud 41 and the slack-thread controlling stud 21 and greatly accelerates the thread-drawing action of the primary take-up element until the pin 19 reaches the end of its runway as represented in Fig. 4, when the thread is forcibly disengaged from said pin by the arched thread-deflector 25 and the thread is instantaneously slackened, thereby causing the primary take-up element to become temporarily ineffective in drawing up the thread, the loop of which at this stage has been drawn up loosely to the lower face of the fabric and out of the path of movement of the loop-taker point in beginning its second or idle rotation. In the continued operative movement of the primary take-up element 17, the slack thread thus formed is drawn up until, as said element approaches its extreme position farthest from the thread-supply and delivery guide-elements 41 and 53 (Fig. 5), the bight of needle-thread is not only tightened and the thread-loop drawn into the fabric to set the stitch, but a thread supply for the next stitch is drawn through the tension device. As the thread-engaging element 17 moves beyond stitch-setting position and begins to give up thread, the primary thread-controlling pin 20 enters its runway between the guard-ribs 35 and engages the limb of the needle-thread bight extending between the guide element 53 and the primary take-up element 17. In its continued movement it draws up the slack given by the primary take-up element and thus insures against the catching of the thread by the descending needle point until the latter enters the work, immediately following which the pin 20 emerges from its runway and the thread is forcibly stripped therefrom by the action of the thread deflecting member 26 (Fig. 6). The bight of thread thus slackened is partially supported by the auxiliary thread-controlling stud 21 while a new loop of thread is seized from the needle and rapidly distended by the loop-taker in the loop-casting operation, thereby utilizing the slack given up by the primary slack-controlling pin. In the movement of the rotary take-up disk from the position represented in Fig. 6, corresponding with loop-seizing position, to substantially the position represented in Fig. 3 corresponding with the initial take-up action, the primary take-up element is disengaged from the thread, and the auxiliary slack-controlling stud 21 gives up its slack for the loop-casting operation. As the primary take-up element 17 engages the thread adjacent the guide-pin 53, the thread-drawing actions above described are repeated for the new stitch-forming cycle.

It is obvious that the specific manner in which the thread is controlled in the various stages of the stitch-forming cycle will be determined by the distance of the several thread-engaging elements from the axis of rotation of the take-up member, and their circumferential spacing apart, which, with the number of such thread-engaging elements, may be varied to conform with the specific requirements of the loop-taker employed to coöperate with the needle in the production of stitches. As these parts are arranged in the present embodiment of the improvement, no actual strain is imposed upon the needle-thread excepting in the stitch-setting action, the needle-thread within the field of action of the take-up elements being at other important stages in the stitch-forming cycle controlled so as to be free from loops without being tightened. By the employment of the coacting rotary and stationary thread-engaging elements afforded by the pins or projections upon the rotary disk and the guard ribs for their outer ends disposed upon the stationary disk, means are afforded for insuring the precise extent and timing of engagement of the thread to effect its perfect control in coöperation with the style of loop-taker employed.

In the embodiment of the improvement herein represented, the arched thread-deflectors 25 and 26 not only serve to forcibly strip the thread from their respective pins at the end of a period of engagement with the thread, but operate to shield the ends of the respective pins from a second engagement with the thread in the same stitch-forming cycle. These deflectors, although desirable as a precaution in insuring the proper timing of engagement of the pins with the thread, are obviously not essential to the present improvement, as the construction is otherwise such as to cause these elements to perform their functions properly.

By provision for adjustment of the eyelet-stud 40 41, the extent of take-up action of the thread-engaging element 17 may be varied, but with a proper initial adjustment, the take-up will accommodate the stitch-forming mechanism to fabrics of considerably varying thicknesses.

It is thus evident that the present improvement is adapted for employment in conjunction with stitch-forming mechanisms of different types and varieties, and that it is susceptible of very material modification in the construction and arrangement of its component parts within the scope of the invention.

Having thus set forth the nature of the invention, what I claim herein is:—

1. A take-up device comprising a rotary member having a plurality of thread-engaging projections, positively acting means for maintaining the thread in engagement with said projections respectively during portions of a revolution, and means for stripping the thread from one of said projections at a predetermined point and before the completion of said revolution.

2. A take-up device comprising a rotary member, a stationary member substantially parallel therewith and spaced therefrom, and a plurality of coacting thread-engaging elements mounted upon each of the adjacent faces of said rotary and stationary members and disposed within the intervening space.

3. A take-up device comprising laterally spaced rotary and stationary members, a thread-engaging element upon said rotary member, a plurality of thread-engaging elements upon the rotary member within the field of action of the first-named element, and thread-engaging elements upon the stationary member coacting with said plurality of thread-engaging elements and spaced apart circumferentially.

4. A take-up device comprising a rotary member, a thread-drawing element carried thereby, a plurality of thread-controlling elements also carried by said rotary member and each adapted to act during each rotation of said member upon a single bight of thread extending across the face of said rotary member and engaged by said thread-drawing element, and a plurality of stationary elements circumferentially spaced apart and coacting each with one of said plurality of elements carried by the rotary member.

5. A take-up device comprising a rotary member, a plurality of thread-engaging elements disposed upon one and the same face of said member, positively acting means for confining the thread in engagement with said elements during portions of each rotation of said member, and positively acting means for effecting the disengagement of the thread from said elements.

6. A take-up device comprising a rotary member, a thread-drawing element carried thereby and adapted for positive engagement with the needle-thread, means for rendering said element ineffective in its drawing action while the thread is taut, and a thread-engaging element also carried by said member and adapted to control the slack thread in the portion of each rotation of said member succeeding the period of action of said thread-drawing element.

7. A take-up device comprising a rotary member, a thread-drawing element carried thereby, and means including a second thread-drawing element carried by said rotary member and stripping means therefor for effecting a plurality of successive operative engagements of said element with the needle thread in each rotation of said member.

8. A take-up device comprising a rotary member, a thread-drawing element carried thereby and adapted for continuous and positive engagement with the needle-thread, and additional means acting upon the needle-thread throughout a portion of a revolution of said rotary member and adapted to interrupt its action upon the needle thread during a portion of the period of said thread-drawing action.

9. The combination with a reciprocating needle, of a take-up device comprising a rotary member performing a single rotation for each reciprocation of the needle, a stitch-setting element carried by said rotary member and adapted to engage the needle-thread, a plurality of thread-controlling elements also carried by said rotary member and adapted each for positive engagement with the needle-thread, and stripping means coacting with said plurality of thread-controlling elements for rendering them ineffective while the thread is taut during its engagement by the same.

10. The combination with a rotary shaft, a needle, and a crank-and-pitman connection between said shaft and the needle, of a take-up member fixed upon and rotating with said shaft, a stitch-setting element carried by said member and adapted to engage the needle-thread, a thread-controlling element fixed upon said member and adapted to act positively upon the needle-thread, and stripping means coacting with said thread-controlling element to positively disengage the thread therefrom.

11. A take-up device comprising a rotary member, primary and auxiliary take-up elements carried by said rotary member, and means for effecting the simultaneous engagement of both of said elements with the thread during a portion of a revolution for imparting an initial thread-drawing action and for thereafter effecting a second engagement of one of said take-up elements with the thread in the same rotation for producing a stitch-setting action while the second of said elements remains inactive upon the thread.

12. In a sewing machine, a rotary take-up comprising a rotary part and a stationary part, means for taking up the thread carried by the rotary part, an auxiliary thread-drawing element also carried by said rotary part and a device sustained by the stationary part and conforming with the path of movement of said auxiliary thread-drawing element and adapted to keep the thread in engagement with the same during its action upon the thread.

13. In a sewing machine, a rotary take-up comprising a rotary part, primary means for taking up the thread carried by said rotary part, a stationary part adapted to coöperate with said primary means, an auxiliary take-up pin carried by said rotary part, and a segmental guard sustained by said stationary part for coaction with said pin in confining the thread in engagement therewith.

14. In a sewing machine, a rotary take-up comprising a rotary part, a stationary disk in which a groove is formed and located concentric with the axis of said rotary part, a take-up segment carried by said rotary part and constructed and located so as to extend into said groove, a segmental groove formed in said disk, and a pin carried by said rotary part which extends into said segmental groove.

15. In a sewing machine, a rotary take-up comprising a stationary part provided with a plurality of concentric grooves, a rotary part, and a plurality of means for taking up the thread carried by said rotary part and located and adapted to extend into said grooves.

16. In a sewing machine, a rotary take-up comprising a rotary disk provided with a plurality of thread-engaging parts each located a different distance from the axis of rotation, and a disk constructed with means for covering the ends of said thread-engaging parts for keeping the thread in engagement therewith.

17. In a sewing machine, means for delivering and taking up the thread in the stitch-forming operation comprising a rotary part, one or more pins carried by said rotary part for engaging the thread, means separate from said rotary part for holding the thread on said pin or pins, and means carried by said rotary part for disengaging the thread from said pin or pins.

In testimony whereof, I have signed my name to this specification, in the presence of two subscribing witnesses.

WILLIAM N. PARKES.

Witnesses:
HENRY J. MILLER,
H. A. KORNEMANN, Jr.